United States Patent
Hoskins

[11] 3,878,597
[45] Apr. 22, 1975

[54] ALIGNING TOOL FOR ASSEMBLING STEEL GIRDERS

[76] Inventor: Kenneth A. Hoskins, Rt. No. 1, Goodview, Va. 24095

[22] Filed: Nov. 6, 1973

[21] Appl. No.: 413,344

[52] U.S. Cl. ............................................. 29/271
[51] Int. Cl. ........................................... B25b 27/00
[58] Field of Search ............ 29/271, 272, 280, 283; 269/48.1, 234; 279/60, 1 F, 1 L, 2

[56] References Cited
UNITED STATES PATENTS

| | | | |
|---|---|---|---|
| 976,325 | 11/1910 | Wheeler et al. | 29/282 UX |
| 993,829 | 5/1911 | Horrocks et al. | 279/2 |
| 1,448,528 | 3/1923 | Elliott | 29/272 |

Primary Examiner—Al Lawrence Smith
Assistant Examiner—Harold P. Smith, Jr.

[57] ABSTRACT

A tool for aligning holes in the flanges and angles of steel girders to be assembled to each other providing a detachably fixed device in lieu of "drift pins" and the like used for such purposes wherein unnecessary time and effort is required to remove them after the girders are bolted in place, the present invention providing an expansible "bolt-like" device having tapered jaws which can be inserted into the matching bolt holes, aligning them properly so that the remaining matching holes can be properly bolted together, and thereafter the tool or device can readily be removed without undue force.

2 Claims, 2 Drawing Figures

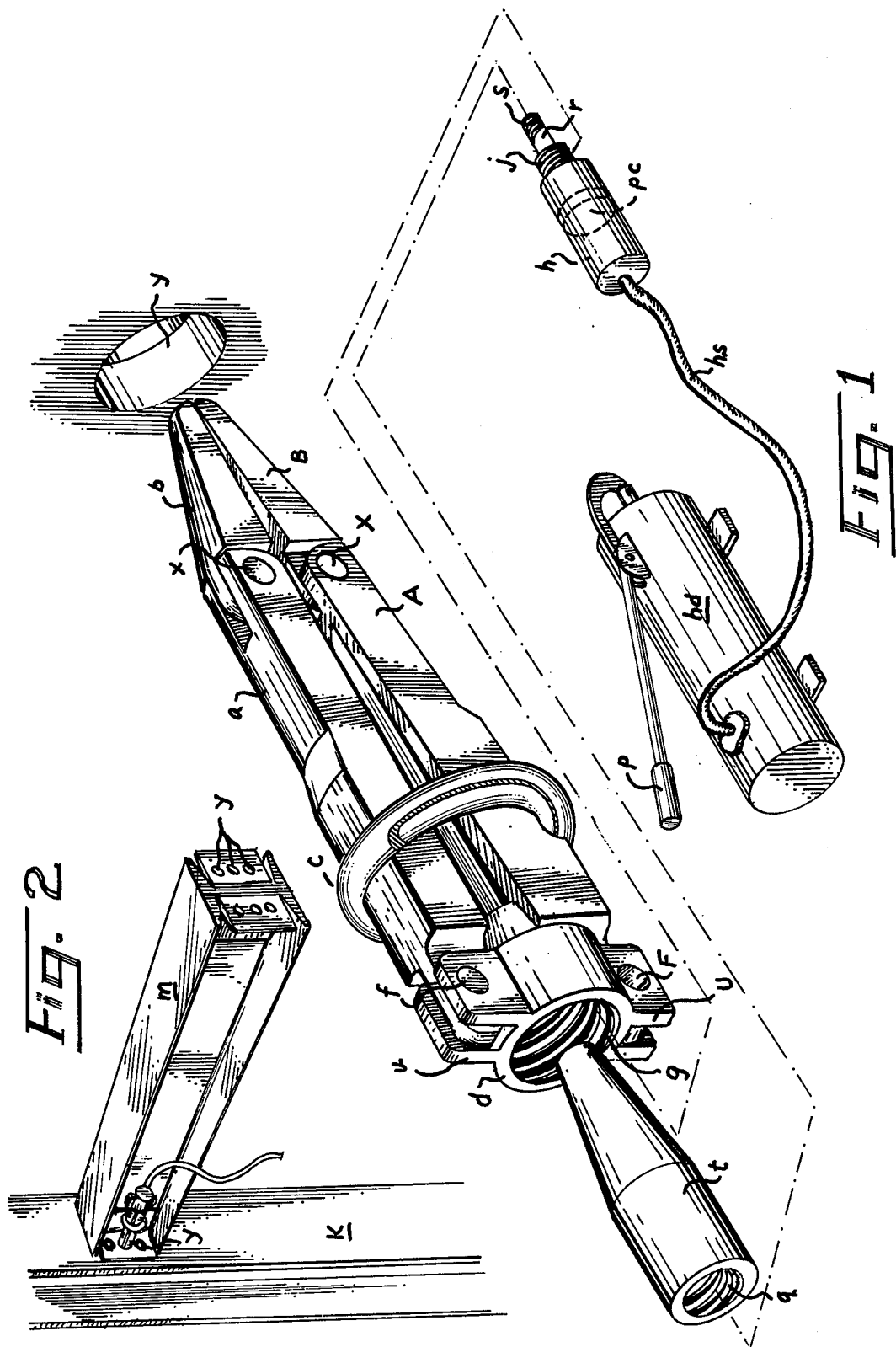

ALIGNING TOOL FOR ASSEMBLING STEEL GIRDERS

BACKGROUND OF THE INVENTION

In constructing steel structures and the like, particularly buildings having extensive steel framework, numerous beams and columns are bolted together, or riveted, via multi-holed flanges and angles prefabricated into the members of the framework. It is customary to hoist the heavy members into position and temporarily hold them together with "drift pins," or the like, until the permanent bolts, or rivets, in the remaining "matching" holes are in place, thereafter bolting the remaining holes after withdrawing the drift pins. In many instances, however, these pins become bound and have to be removed by cutting torch.

SUMMARY OF THE INVENTION

In recognition of this difficulty the present invention provides an expansible type of drift pin wherein holes in structural pieces can be aligned quickly and efficiently, bolted and thereafter the temporary aligning devices are removed without difficulty or delay merely by the functioning of the expansible pin construction of the aligning tool.

DESCRIPTION OF THE DRAWINGS

FIG. 1 is an exploded view in perspective of the aligning tool of the invention.

FIG. 2 illustrates how the tool shown in FIG. 1 is applied between the flange of a column and the angle of a beam to be connected thereto.

DETAILED DESCRIPTION

Referring to FIG. 1 a threaded collar $d$ having extending bifurcated sections $u$ and U has jaw members $a$ and A, respectively, connected at the pivots $f$ and F, the members $a$ and A normally being urged together by a split spring C. The member $a$ has a tapered tip $b$ pivoted in the extremity of $a$ at $x$, and the member A has a tapered tip B pivoted in the extremity of A at X.

A cylinder $h$ having a threaded end $j$ is provided with a piston rod $r$ having a threaded end $s$, the end of the cylinder $j$ being connected into the collar $d$ via threads $g$ and the threaded end $s$ being connected to the threads $q$ in a wedge $t$ which is extendable through the collar $d$ between the members $a$ and A to force them apart, thereby expanding the ends $b$ and B. The cylinder $h$ is coupled hydraulically via a line $hs$ to a pump $hd$ having an operating handle $p$. The cylinder $h$ is equipped with a double diaphram $pc$ permitting the piston rod $r$ to be reciprocated.

In operation the aligning tool is inserted into a bolt hole $y$ (See also FIG. 2) common to the flange of a column $k$ and a beam $m$ as shown in FIG. 2 thereby aligning the other bolt holes adjacent to the hole $y$ after the beam is hoisted up to the columnar position required. Thereafter the other holes are bolted. The aligning tool is inserted into the hole $y$ until the jaws $a$ and A guided by the tips $b$ and B fill the hole so that any misalignment of the holes $y$ is corrected as the jaws $a$ and A are opened by the wedge $t$ under control of the piston rod $r$ when the pump $hd$ is operated by its handle $p$ to force the wedge $t$ through the collar $d$. The adjacent holes (then aligned) are bolted and the pump $hd$ is released thereby reversing the piston $pc$ and pulling the rod $r$ to withdraw the wedge $t$ from the collar $d$ and allowing the jaws to come together under the urging of the spring C. The aligning hole is then bolted being held in place by the other bolts already in place.

What is claimed is:

1. A tool for aligning matching holes in the assembly of steel girders and the like comprising a collar having bifurcated extensions on opposite sides thereof, a pair of jaw members, each pivoted at one end in one of said extensions, the opposite end of each said member having a tapered portion pivoted thereto, said tapered portions together being insertable into bolt holes or the like of girders to be assembled by bolting or riveting for alignment thereof, a resilient split ring surrounding said members normally urging them together, a wedge extendable through said collar coacting with and between said members to force said tapered portions apart, a hydraulic cylinder attached to said collar, and a piston therein connected to said wedge for opening said jaw members.

2. The invention of claim 1 wherein said piston is arranged to operate reversibly in said cylinder to open and close said jaw members.

* * * * *